Figure 1:
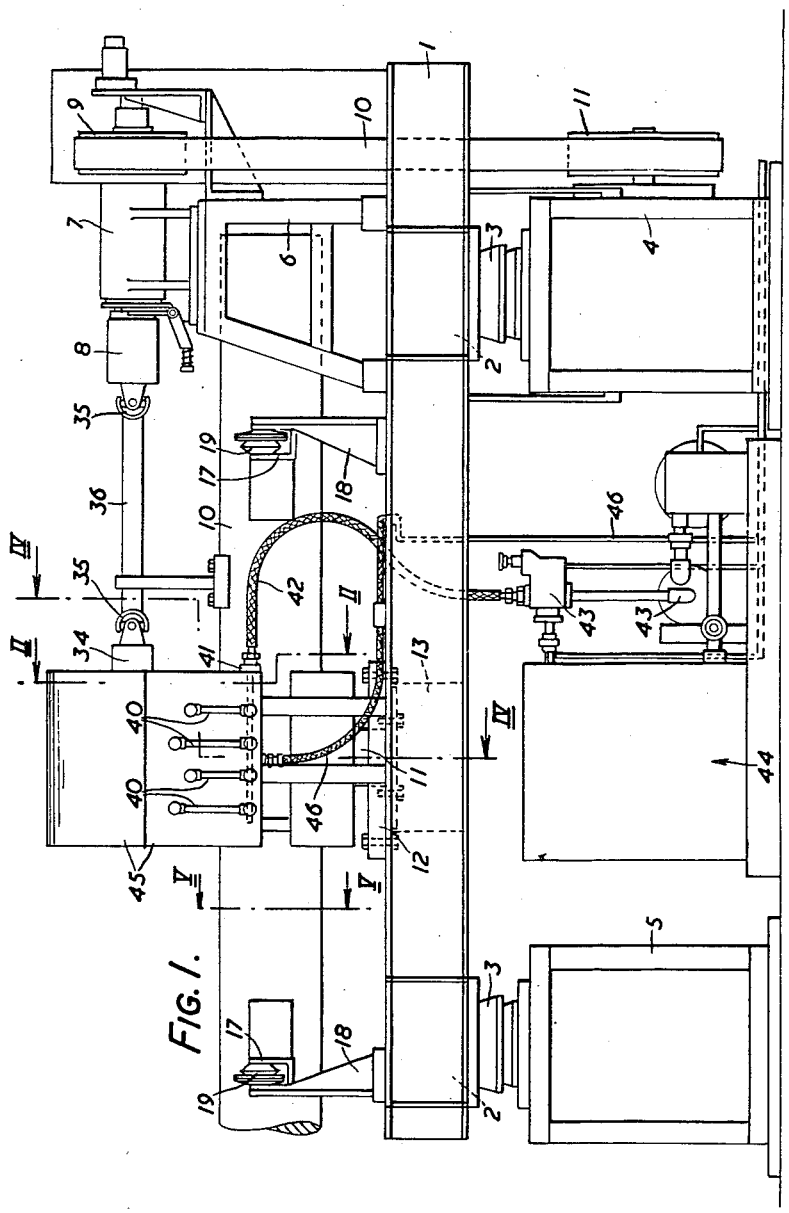

Oct. 30, 1962    A. E. BURKE    3,060,720
MACHINE FOR TESTING BEARING FOR FATIGUE STRENGTH
Filed Sept. 13, 1960    3 Sheets-Sheet 2

Oct. 30, 1962 A. E. BURKE 3,060,720
MACHINE FOR TESTING BEARING FOR FATIGUE STRENGTH
Filed Sept. 13, 1960 3 Sheets-Sheet 3

3,060,720
MACHINE FOR TESTING BEARING FOR FATIGUE STRENGTH

Anthony Edgerton Burke, Wembley, England, assignor to The Glacier Metal Company Limited, Wembley, England, a company of Great Britain
Filed Sept. 13, 1960, Ser. No. 55,768
Claims priority, application Great Britain Sept. 18, 1959
11 Claims. (Cl. 73—7)

The present invention relates to machines for testing bearings for fatigue strength under conditions of fluctuating load, for which purpose it is inconvenient and unsatisfactory in most cases to do the tests in actual engines since, in such engine tests, not only are the bearing loads not accurately determinable, but it is not possible to control sufficiently other factors than load which affect fatigue performance, such as for example, the lubricant supply and ambient temperature. Moreover when engines are run under conditions likely to cause bearing fatigue, other components of the engine are liable to fail.

Special machines have therefore been designed for testing bearings for fatigue strength and those at present in use are of two well-known types. In one type the machine resembles a short stroke single cylinder piston pump, the piston of which draws oil into the cylinder on its suction stroke and discharges oil on its delivery stroke through an adjustable bleed-off valve which thus controls the maximum delivery pressure. The bearing under test in this type of machine is assembled in the big end position, i.e. between the connecting rod and the crank pin and is loaded, as will be apparent by the oil pressure developed in the cylinder during each discharge stroke.

In the other type of machine at present in use, a shaft (hereinafter called a test shaft) which runs in the bearing or bearings to be tested, carries one or more out-of-balance weights, i.e. weights with their centers of gravity displaced from the axis of rotation of the shaft, so that they generate a rotating load. In this type of machine the bearings are mounted in such a way that any one bearing effectively supports the shaft against loads in one plane only. Thus the rotating load is resolved into components in two directions and each resolved component represents an oscillating load imposed on one or a pair of test bearings. In one machine of this type, a long test shaft is used supported at its ends in support bearings while the weight or weights, which provide the rotating load, and the test bearing or bearings are disposed at or near the center of the length of the shaft. It will be apparent that the shaft has to be long in order to ensure that the rotating load generated by the weight or weights is carried substantially completely by the test bearing or bearings and not transferred to the support bearings. In an alternative arrangement of machine of the same type, separate balancing shafts are disposed alongside the test shaft and carry balancing weights so disposed that, during operation, they apply to the machine balancing forces opposing the forces applied by the rotating load on the test shaft. In a still further machine of the same type two test shafts are provided side by side with the weight or weights on the one shaft assembled so as to be 180° out of phase with those on the other shaft, a tuned vibration absorber consisting of a pair of spring-mounted masses being used.

In these previously proposed machines using test shafts carrying out-of-balance weights generating loads to be applied to the test bearing or bearings, if there is more than one weight per shaft the weights are disposed in phase with each other so that the net force generated by the weight or weights is in all cases a rotating force, and, whether such a machine embodies one or two test shafts, it has been found impracticable to design the whole machine so as to operate without an undesirably large vibration amplitude unless (a) the machine is mounted on an inconveniently massive block, or (b) separate balancing shafts are incorporated in the machine, or (c) resonant vibration absorbers are used, or (d) an inconveniently long shaft carrying separate balancing weights is employed.

A machine for testing bearings for fatigue strength according to the present invention comprises a test shaft, four supports displaced from one another longitudinally of the shaft and each arranged to carry a test bearing, by which bearings the shaft will then be supported, the supports comprising two pairs and being so formed and arranged that the bearings carried by one pair of supports can support the shaft against loads substantially in one plane only while the bearings carried by the other pair of supports can similarly support the shaft against loads substantially in one plane only, the two planes being at an angle to one another, and two weights or groups of weights mounted on the shaft at longitudinally spaced points and with their centers of gravity displaced from the axis of the shaft with the directions of their displacement differing by 180°, the masses of the weights and the disposition of their centers of gravity being such that the rotating loads imposed by them on the shaft during rotation are approximately equal. The angle between the two planes referred to may be for example a right angle.

In one preferred form of machine according to the invention the arrangement of the supports and the weights on the shaft will be such that starting from one end of the shaft the bearings under test and the weights would follow the sequence, A, P, B, C, Q, D where A and C are the bearings in one pair of supports, B and D are the bearings in the other pair of supports, and P and Q are the weights. Moreover in such an arrangement the distances A—C, B—D, and P—Q would preferably be equal, as would be the masses of the two weights and the distances of their centers of gravity from the axis of the shaft. With such an arrangement it will be seen that the maximum loads on all four bearings would be equal and would be $W \operatorname{cosec} \vartheta$ where W is the force produced by each weight and $\vartheta$ is the angle between the two planes in which the pairs of supports restrain their respective bearings. It will be seen that with a machine according to the invention there is no net out-of-balance as regards radial forces, but only a couple about an axis which is at right angles to the axis of the test shaft and rotates with this shaft. Moreover the magnitude of this couple may be kept small by disposing the supports for the bearings to be tested and the weights compactly along the shaft so that the distance between the weights is comparatively small.

Thus a machine according to the invention may comprise a single test shaft assembly with the supports for the bearings and the weights arranged compactly along the shaft, the whole being carried by a massive base which in turn may be resiliently supported and if desired provided with an inertia or other vibration damper. The relatively small out-of-balance couple referred to makes such an arrangement practicable without employing either an inconveniently large base or involving too great an amplitude of vibration.

Alternatively a test machine according to the invention may comprise two test shaft assemblies each with the supports and weights arranged in accordance with the invention, the shafts being arranged parallel to one another and so as to rotate in the same direction and at the same speed and the weights on the two shafts being so phased that the out-of-balance couple generated by one test shaft assembly is equal and opposite to that generated by the other test shaft assembly so that there is no net out-of-balance force or couple.

Figure 2:
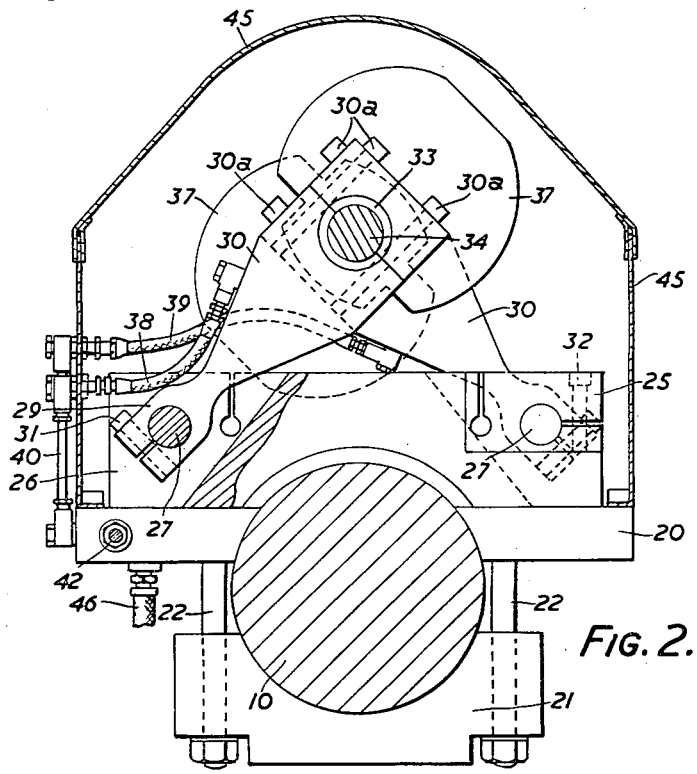
Figure 3:
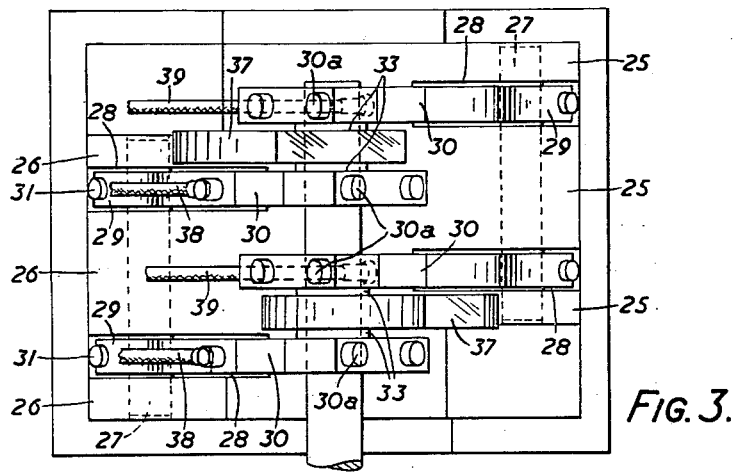
Figure 4:
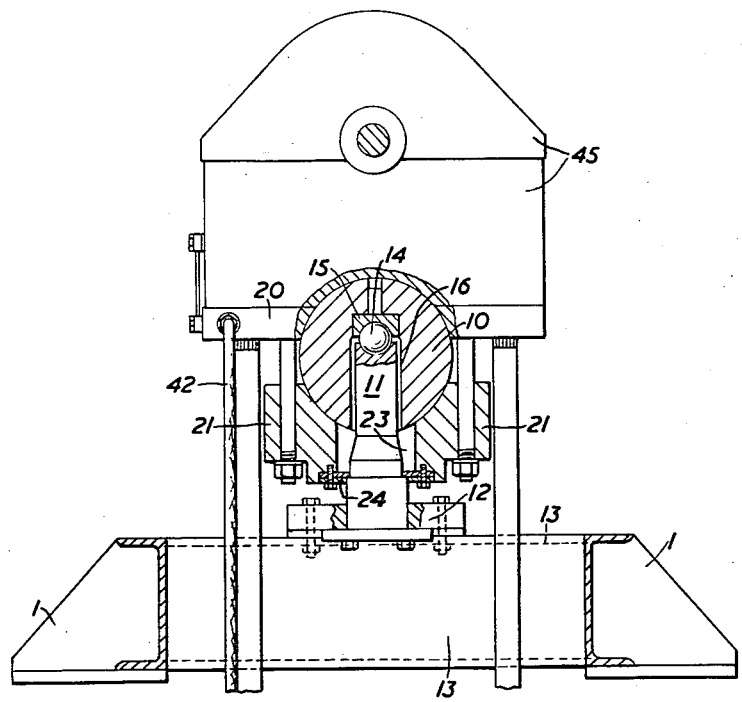
Figure 5:
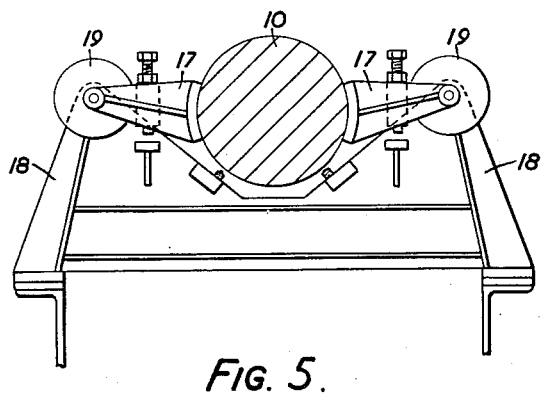

In one arrangement of machine according to the invention, each of the supports for a bearing to be tested may be in the form of a rod or link one end of which carries the bearing to be tested while the other end is connected to a fixed part of the machine, which rod or link is sufficiently long and flexible in bending so that its stiffness against loads on the bearing along its length is much greater than its stiffness against loads at right angles to its length, and one form of test machine according to the invention embodying this feature is shown by way of example in the accompanying drawings, in which FIGURE 1 is a side elevation of the machine as a whole, FIGURE 2 is an end elevation, partly in cross-section on the broken line 2—2 of FIGURE 1, of the part of the machine in which the bearings are mounted and tested, FIGURE 3 is a plan view of the part of the machine shown in FIGURE 2 with the casing removed, FIGURE 4 is an end view of the part of the machine shown in FIGURE 2 and certain associated parts, partly in section on the line IV—IV of FIGURE 1, and FIGURE 5 is a cross-section on the line V—V of FIGURE 1.

The machine as a whole comprises a supporting structure including longitudinal girder members 1 united by transverse girder members indicated at 2, which transverse girder members are supported through flexible supports indicated at 3 on pillar-like supporting parts indicated at 4 and 5. Supported by a framework 6 rigidly mounted on one end of the girder structure 1, 2 is a bearing structure indicated at 7 in which is mounted to rotate a shaft 8 carrying a pulley 9 at one end which is arranged to be driven through a belt 10 from a pulley 11 driven by an electric motor (not shown) housed within the pillar structure 4.

Supported from the girder structure 1, 2, in a manner providing for a limited but controlled relative movement between it and the girder structure 1, 2, is a cylindrical bar 10 of substantial cross-section. This bar is supported at a point intermediate in its length by a pillar support comprising a pillar 11 rigidly secured at its lower end to a mounting block 12 which in turn is rigidly secured to a transverse girder member 13 extending between and rigidly connected to the girders 1. The upper end of the pillar support 11 is formed with an approximately hemispherical cup in which seats the lower half of a ball member 14 the upper portion of which seats in an approximately hemispherical cup in a block 15 mounted at the base of a vertical bore 16 within the bar 10, within which bore the upper part of the pillar support 11 extends freely as shown in FIGURE 4. The bar 10 is also supported at points spaced on either side of the pillar support 11 by four flexible mounting assemblies, a pair of which is shown in end view in FIGURE 5 and each of which comprises an approximately radial arm 17 rigidly secured at its inner end, as by welding, to the bar 10 and connected at its outer end to a bracket 18, rigid with the girder structure 1, 2, through a flexible mounting 19.

The bar 10 is thus supported in such a manner that it can rock to a limited extent about the center of curvature of the ball member 14 but under the restraint of the flexible mounting members 19, which may or may not incorporate fluid or other damping means.

Rigidly secured to the bar 10 so that the center of curvature of the ball 14 lies approximately midway in its length, i.e. approximately below its center of gravity, is an assembly by which the bearings actually to be tested are carried. This assembly comprises a base plate 20 rigidly clamped to the bar 10 by means of a clamping member 21 and bolts indicated at 22, the clamping member 21 being provided with a bore 23 through which passes freely the pillar support 11, as shown in FIGURE 4. A flexible sealing disc 24, surrounding the pillar support, closes the lower end of this bore 23 for the exclusion of foreign matter and/or the retention of lubricant.

Rigidly secured to the upper face of the base plate 20 are supporting blocks 25, 26 provided with horizontal bores with axes parallel to the bar 10, in which horizontal bores are supported pins 27. The supporting blocks 25, 26 are provided with slots, as shown at 28, so that the appropriate parts of the pins 27 extend across the slots and each of the parts of the pins 27 in question engages a bore in one end, 29, of a bearing support 30 in the form of a connecting rod. The end 29 of each rod-like support is clamped to its appropriate pin 27 by a clamping screw indicated at 31. The pins 27 may similarly be clamped within the supporting blocks 25, 26 by clamping screws in the manner indicated at 32 in FIGURE 2, these clamping screws being omitted for convenience of illustration in FIGURE 3.

The ends of the rod-like supports 30 remote from the pins 27 are formed to receive bearings to be tested as indicated at 33, for which purpose the end of each rod-like support in question is formed in two separable parts which can be clamped together by clamping bolts 30a in a generally known manner, so that the bearing being tested is gripped in the same general manner as bearings are commonly gripped in actual use.

The rod-like supports 30 have an effective length, as shown, such that the bores in their inner ends can all lie in line and substantially coaxially with the shaft 8 and, when bearings are to be tested, a shaft 34 is supported in the bearings 33 and connected by two universal joints 35 and a shaft 36 to the shaft 8. As will be apparent from FIGURE 3, the rod-like supports 30 are arranged in pairs with each pair lying adjacent to one end portion of the shaft 34 and with the space between the two supports constituting each pair. Clamped to the shaft 34 within each of these spaces is a weight 37 having its center of gravity substantially displaced from the axis of the shaft 34. As shown the two weights 37 are of equal size and arranged so that their centers of gravity lie on diametrically opposite sides of the axis of the shaft 34.

It will also be seen that in the construction shown and described above the two rod-like supports connected to the block 26 support their associated bearings against loads in one plane only while the two rod-like supports connected to the block 25 support their associated bearings against loads in another plane only, which other plane is substantially at right angles to the first plane referred to. It will be apparent that with this arrangement the bearings carried in the rod-like supports 30 will, during rotation of the shaft 34, be subjected to loads, the direction of which is along the axis of the respective rod, that is in the plane common to the center line of the shaft 34 and the center line of the respective pin 27, and the magnitude of which oscillates at the frequency of rotation of the shaft 34.

In addition it will be seen that if A, B, C and D be regarded as denoting the four bearings under test in the order in which they are disposed, and P and Q the two weights, the distances A—C, B—D and P—Q are approximately equal.

With this arrangement the maximum value of the oscillating load which is applied to the test bearings 33 is equal to the magnitude of the rotating load generated by each of the weights 37.

Each of the rod-like supports 30 has formed in it oil feed passages (not shown) of conventional form leading to the bearing which it carries and flexible oil feed pipes indicated at 38 and 39 are provided by which, during test, oil can be fed continuously at a determined rate to each of the bearings.

As will be seen, these flexible oil feed pipes 38, 39 are arranged to receive oil from rigid oil feed pipes indicated at 40, which in turn receive oil from a common oil feed gallery 41 in the base plate 20 fed through a common flexible oil feed pipe 42 connected to oil feed apparatus of known type indicated generally at 43.

It will be appreciated that the oil feed apparatus 43 will be of some known type by which the rate and/or pressure of oil delivered from a reservoir 44 can be varied at will.

The apparatus including the rod-like supports 30 and associated parts is enclosed, as shown, within a casing 45 of which the plate 20 constitutes the base, and an oil drain pipe 46 leads from the chamber thus enclosed for the purpose of returning oil which may tend to collect in the casing 45 to the oil feed apparatus 43. It will be understood that the center of the ball member 14 approximately coincides with the center of gravity of the assembly consisting of the bar 10 with all the components of the machine which are rigidly attached to it including also shaft 36 and the weights 37.

Although in the construction shown there is a single assembly comprising the base plate 20 and its associated parts, in a modification the main supporting structure might be arranged to carry two such assemblies, the two shafts 34 then lying parallel to one another and with their weights 37 lying in substantially the same planes but being so out of phase with one another that when the two shafts are rotated simultaneously at the same speed the forces transmitted to the whole structure by the weights 37 tend to counterbalance one another. If this arrangement is used the massive bar 10 is not required and the base plate 20 suitably modified in shape to carry the two assemblies, may be rigidly mounted on the girder structure 1, 2.

It will also be understood that in the construction shown the rod-like supports 30 conveniently have such flexibility in bending that their stiffness against loads on the bearing along the length of these rod-like supports is much greater than their stiffness against loads at right angles to this length.

What I claim as my invention and desire to secure by Letters Patent is:

1. A machine for testing bearings for fatigue strength comprising a test shaft, four supports displaced from one another longitudinally of the shaft and each formed to carry a test bearing, by which bearings the shaft will then be supported, the supports comprising two pairs and being so formed and arranged that the bearings carried by one pair of supports can support the shaft against loads substantially in one plane only while the bearings carried by the other pair of supports can similarly support the shaft against loads substantially in one plane only, the two planes being at an angle to one another, and two weights or groups of weights mounted on the shaft at longitudinally spaced points and with their centers of gravity displaced from the axis of the shaft with the directions of their displacement differing by 180°, the masses of the weights and the disposition of their centers of gravity being such that the rotating loads imposed by them on the shaft during rotation are approximately equal.

2. A machine for testing bearings for fatigue strength as claimed in claim 1, in which the two planes referred to are substantially at right angles to one another.

3. A machine for testing bearings for fatigue strength as claimed in claim 2, in which the arrangement of the supports and the weights in relation to the shaft is such that, starting at one end of the shaft, the bearings under test and the weights are arranged in the sequence A, P, B, C, Q, D where A and C are the bearings in one pair of supports, B and D are the bearings in the other pair of supports, and P and Q are the weights.

4. A machine for testing bearings for fatigue strength as claimed in claim 3, in which the distances A—C, B—D and P—Q are approximately equal.

5. A machine for testing bearings for fatigue strength as claimed in claim 1 in which the supports are carried by a structure which is resiliently supported.

6. A machine for testing bearings for fatigue strength as claimed in claim 1 in which the arrangement of the supports and the weights in relation to the shaft is such that starting at one end of the shaft, the bearings under test and the weights are arranged in the sequence A, P, B, C, Q, D, where A and C are the bearings in one pair of supports, B and D are the bearings in the other pair of supports, and P and Q are the weights.

7. A machine for testing bearings for fatigue strength as claimed in claim 6 in which the distance A—C, B—D and P—Q are approximately equal.

8. A machine for testing bearing fatigue strength comprising a supporting structure, a test shaft, four supports displaced from one another longitudinally of said shaft and each formed to carry a test bearing, by which bearings the shaft will then be supported, said supports consisting of two pairs and being so formed and arranged that the bearings carried by one pair of supports can support the shaft against loads substantially in one plane only while the bearings carried by the other pair of supports can similarly support the shaft against loads substantially in one plane only, the two planes being at an angle to one another, each of said supports being in the form of a rod connected to said supporting structure at a point in its length substantially displaced radially from the axis of the bearing which it carries, and two weights or groups of weights mounted on the shaft at longitudinally spaced points with their centers of gravity displaced from the axis of the shaft with the directions of their displacement differing by 180°, the masses of the weights and the disposition of their centers of gravity being such that the rotating loads imposed by them on the shaft during rotation are approximately equal.

9. A machine for testing bearings for fatigue strength as defined in claim 8 in which the two planes referred to are substantially at right angles to one another.

10. A machine for testing bearings for fatigue strength as defined in claim 9 in which the arrangement of the supports and the weights in relation to the shaft is such that, starting at one end of the shaft, the bearings under test and the weights are arranged in the sequence A, P, B, C, Q, D where A and C are the bearings in one pair of supports, B and D are the bearings in the other pair of supports, and P and Q are the weights.

11. A machine for testing bearings for fatigue strength as defined in claim 5 in which the resiliently supported structure is provided with damping means.

References Cited in the file of this patent
UNITED STATES PATENTS

| | | |
|---|---|---|
| 2,033,588 | Pigott et al. | Mar. 10, 1936 |
| 2,037,939 | Spring et al. | Apr. 21, 1936 |
| 2,439,035 | Bidwell et al. | Apr. 6, 1948 |